United States Patent [19]
Naito

[11] Patent Number: 5,387,156
[45] Date of Patent: Feb. 7, 1995

[54] ELASTIC COUPLING, INCLUDING A HOUSING HAVING A BOTTOM, HAVING RUBBER MEMBERS EXTENDING BETWEEN WINGS OF A DRIVING OR DRIVEN HUB AND BUSHES OF A DRIVEN OR DRIVING MEMBER

[75] Inventor: Kenichi Naito, Kanagawa, Japan

[73] Assignee: Bridgestone Corporation, Tokyo, Japan

[21] Appl. No.: 64,725

[22] Filed: May 19, 1993

Related U.S. Application Data

[63] Continuation of Ser. No. 651,837, Feb. 7, 1991, abandoned.

[30] Foreign Application Priority Data

Feb. 10, 1990 [JP] Japan .................................. 2-30671

[51] Int. Cl.⁶ .............................................. F16D 3/64
[52] U.S. Cl. ...................................... 464/93; 464/170
[58] Field of Search ................ 464/94, 92, 93, 95, 464/87, 106, 170

[56] References Cited

U.S. PATENT DOCUMENTS

| | | | |
|---|---|---|---|
| 1,505,480 | 8/1924 | Manville | 464/92 X |
| 3,683,643 | 8/1972 | Kirschey | 464/93 |
| 3,731,499 | 5/1973 | Morlon | 464/93 |
| 4,216,842 | 8/1980 | Decouzon | 464/93 X |

FOREIGN PATENT DOCUMENTS 842126   7/1960   United Kingdom ................ 464/93

*Primary Examiner*—Daniel P. Stodola
*Assistant Examiner*—Eileen A. Dunn
*Attorney, Agent, or Firm*—Jordan and Hamburg

[57] ABSTRACT

An elastic coupling includes a flange with wings extending radially outwardly from the center of a main body. Bushes arranged between the wings have outer surfaces radially outwardly of the outer ends of the wings. Elastic rubbers connect the wings and the bushes. A round housing having a bottom compresses the bushes. The inner radius of the housing is larger than the radius of the wings, but smaller than the radii of the bushes. The elastic rubbers are compressed by compressively inserting the main body into the housing.

5 Claims, 4 Drawing Sheets

ELASTIC COUPLING, INCLUDING A HOUSING HAVING A BOTTOM, HAVING RUBBER MEMBERS EXTENDING BETWEEN WINGS OF A DRIVING OR DRIVEN HUB AND BUSHES OF A DRIVEN OR DRIVING MEMBER

This application is a continuation, of application Ser. No. 07/651,837, filed Feb. 7, 1991, now abandoned.

BACKGROUND OF THE INVENTION

The present invention relates to an elastic coupling using rubber members, and is the elastic coup which is utilized between a driving shaft and a driven shaft and transmits a rotary force.

As for conventional elastic couplings, such couplings as shown in FIG. 1 and FIG. 2 are generally known: In a state of the elastic coupling shown in FIG. 1 wherein bands 7 are not yet attached. The coupling has three fixed wings 2 which individually extend radially with equiangular intervals from a flange 1 near the center of an axis, and bushes 3 which are each formed between individual said fixed wings are arranged on concentric circles, and elastic rubbers 4 interconnect these. In general, front ends of the wings 2 are arranged on the concentric circles, and the bushes 3 are, on the other hand, arranged on the concentric circles of a radius $R_2$, which is slightly larger than a radius $R_1$ extending to the front ends of the wings 2. In addition, a hole 5 for connection to a rotary shaft, which is not indicated in the Figures, is provided in each bush 3. Moreover, an axial hole 6 for connection to a spline is formed in the center of the flange 1 to be inserted and fixed to a spline shaft which is not shown in the Figures. A sign "a" shown in FIG. 1 indicates hollows.

In case that the elastic coupling is utilized as a coupling, it so devised that a stress which acts on the elastic rubbers 4 always acts on said rubbers when they are in a compressed state. This is to protect against the deterioration of the elastic rubbers 4 in their early stages which occurs when compressive stress and tensile stress act on said rubbers 4. Accordingly, in this example, the bushes 3 on the concentric circles can be fitted to the shaft with a slight push while directing them toward the center.

FIG. 2 shows an example when the rubbers are in a compressed state. In this case, semicircular bands 7 are first applied to them from the outside of the bushes 3, and then bolts 8 and nuts 9 are tightened so that the outward ends of the bushes 3 are pushed toward the center of the circle, and the radius ($R_2$) between the outer surface of the bushes 3 and the center shown in FIG. 1 assumes a radius $R_o$ smaller than the radius $R_2$. The radius $R_o$ which is formed by the semi-circular bands 7 is in a relationship of $R_2 > R_o > R_1$. That is, by this extent, the radius extending to the outer surface of the bushes 3 is shortened, which can be easily understood by observing the deformation of the passages "a".

In this way, the elastic rubbers 4 between the bushes 3 having the reduced radius and the fixed wings 2 are precompressed at the time of fitting the coupling to the shaft, which leads to the prevention of the deterioration of said rubbers in their early stages. The process of reduction of the radius extending to the outer surface of the bushes 3 mentioned above is incidental to any elastic couplings. Just like this example, the bands 7 have to be applied to the bushes 3, and the bands 7 have to be tightened by bolts 8 and nuts 9, and when the fitting to the shaft is completed, the bands 7 have to be removed. Therefore, the operation efficiency is extremely impaired.

Although it is beyond the possibility that the coupling is utilized without removing the bands 7, if it is utilized with the bands 7 being attached, the bands 7 get out of line as soon as the rotation starts, because they are not fixed to the bushes 3, the fixed wings 2 and the like, which invites a serious danger. Moreover, as tightened portions of the bands 7 protrude from the circumference of the coupling, they produce abnormal sound in rotation. Thus, it is impossible to put it to practical use without removing the bands.

SUMMARY OF THE INVENTION

Objects of the present invention are to improve the aforementioned short-coming and to provide an elastic coupling of which joining to a shaft is easily done as well as a simple reduction of a radius which extends to the outer surface of the bushes.

In order to achieve the above-mentioned objects, the present invention comprises a main body of a coupling having wings extending outwardly in radial direction from the center of the main body, bushes and elastic rubbers which connect the wings and the bushes, a flange provided with the wings. The bushes are arranged between the wings and have outer surfaces located outwardly in radial direction from the outer ends of the wings. A pressing means pressing the bushes toward the center of the main body from the outer circumference of the main body and formed as a round housing having a bottom. The inner radius of the housing is larger than the radius connecting the outer ends of the wings and the center of the body but is smaller than the radius connecting the outer surface of the bushes and the center of the main body. Further, characteristically speaking, when using the round housing having a bottom, it can be fitted to the shaft without removing it as a part of the elastic coupling, so the quite troublesome process of reducing the radius extending to the outer surface of the bushes, as shown in the examples of the prior art, can be completely avoided.

As described above, the round housing is provided with the bottom. Holes or notched grooves are made in the bottom in correspondence with attachment holes provided in the bushes. Therefore, they can be utilized for the attachment to a rotary shaft or a spline shaft.

By being attached to the rotary shaft or the spline shaft as mentioned above, the bottom is firmly fixed. As a result, the reduced radius extending to the outer surface of the bushes is retained semipermanently, which contributes toward delay of the deterioration of the elastic rubbers.

In addition, in the above-mentioned elastic coupling, the round housing having a bottom forms the outer circumference of the coupling. So, the coupling has a perfect round shape, and has no weak points to generate abnormal sound when it rotates at a very high velocity.

DETAILED DESCRIPTION OF THE PREFERRED EMBODIMENTS

Preferred embodiments of the present invention will now be described with reference to the accompanying drawings shown from FIG. 3 to FIG. 7.

Figure 1:
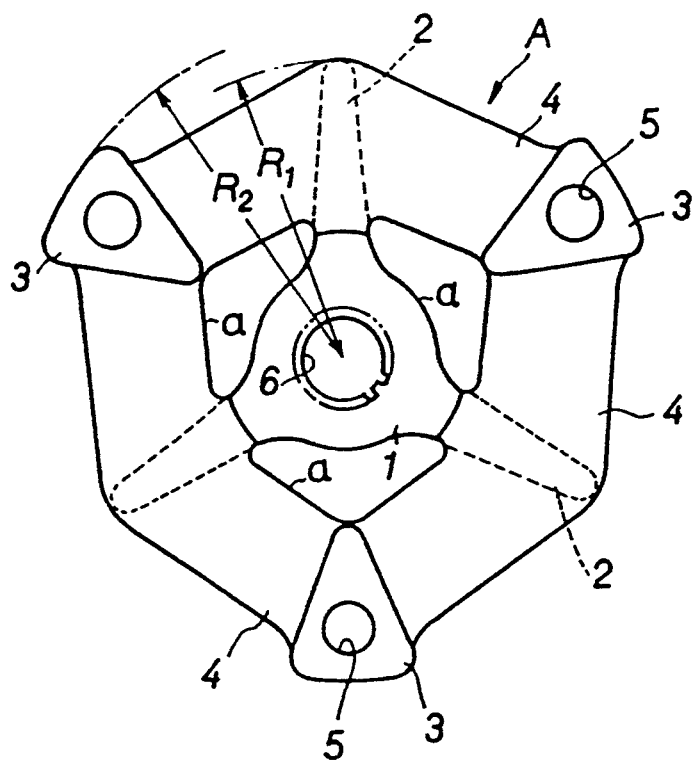
FIG. 1 is a front view of the main part of a conventional elastic coupling prior to the attachment of the bands.
Figure 2:
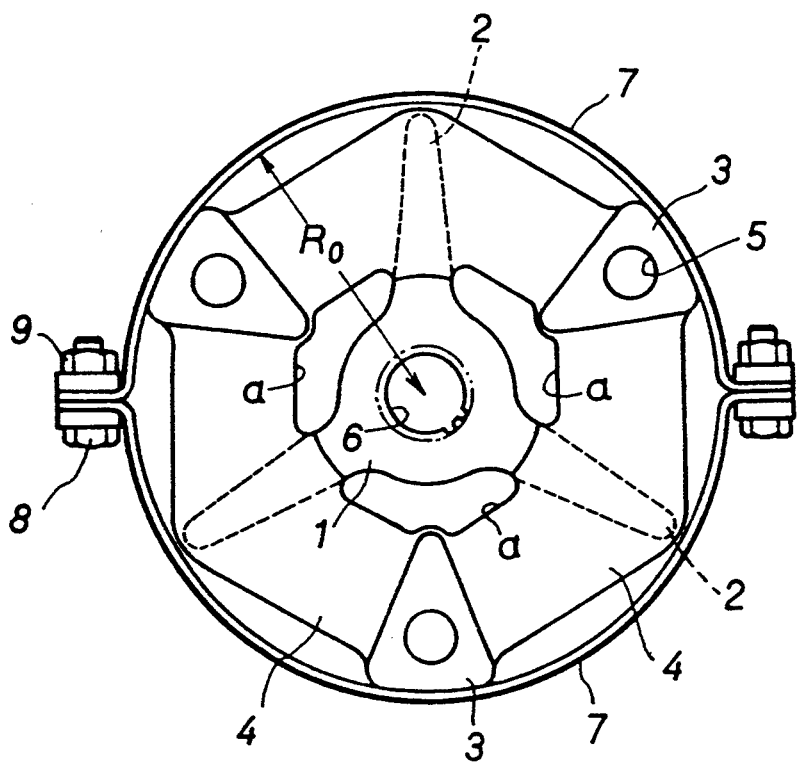
FIG. 2 is a front view of the conventional elastic coupling at the time of the attachment of the bands.
Figure 3:
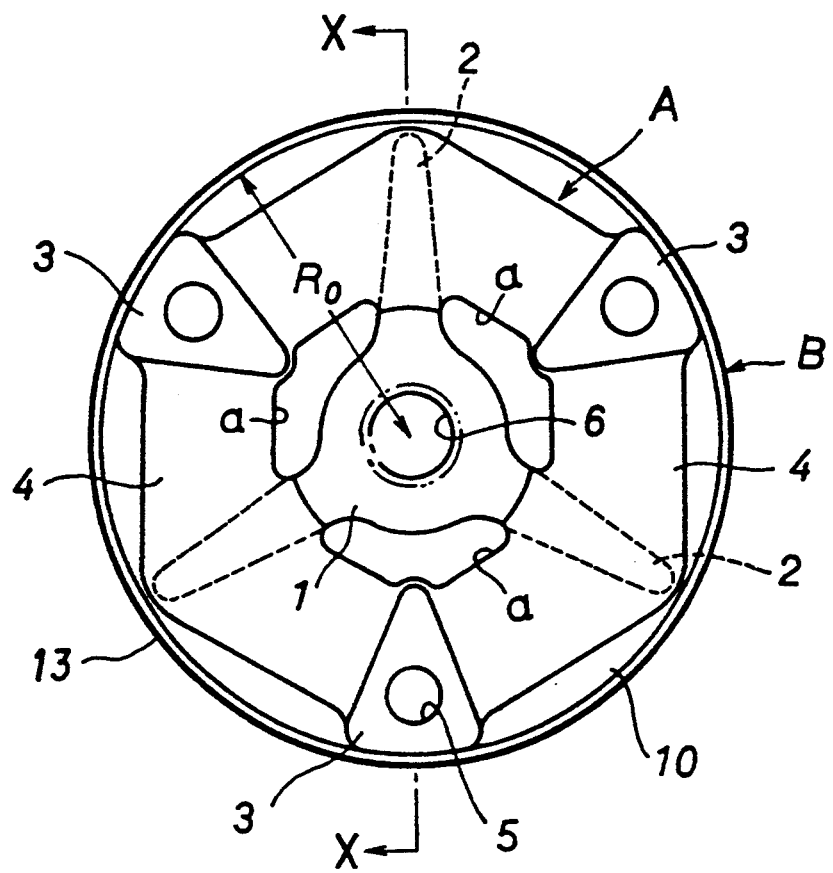
FIG. 3 is a front view of an elastic coupling of the present invention.

The main body of an elastic coupling indicated by a signal "A" in FIG. 3 is similar to that of FIG. 1. That is, it is provided with three fixed wings 2, three bushes 3 and elastic rubbers 4 which connect the fixed wings 2 and the bushes 3. An axial hole 6 for connection to a spline is formed in the center of a flange 1. Holes 5 for connection to a rotary shaft are made in the bushes 3. Also, passages shown by a sign "a" are formed around the flange 1. The part which is indicated by a sign "B" in FIG. 3 is a round housing with a bottom: No conventional bands as shown by 7 in FIG. 1 are employed.

Figure 4:
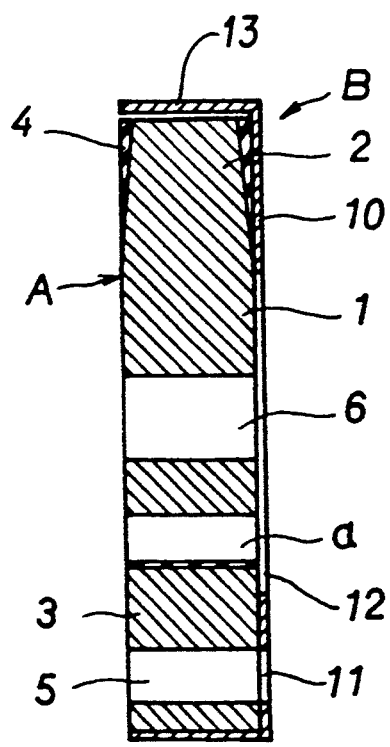
FIG. 4 is a sectional view taken along line X—X of FIG. 3.
Figure 5:
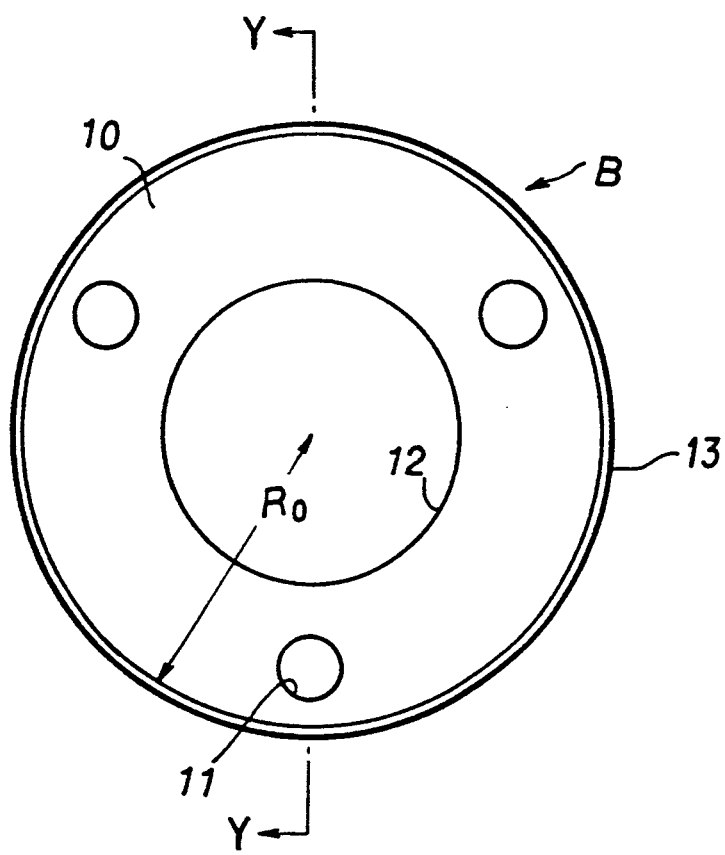
FIG. 5 is a front view of a round housing having a bottom.
Figure 6:
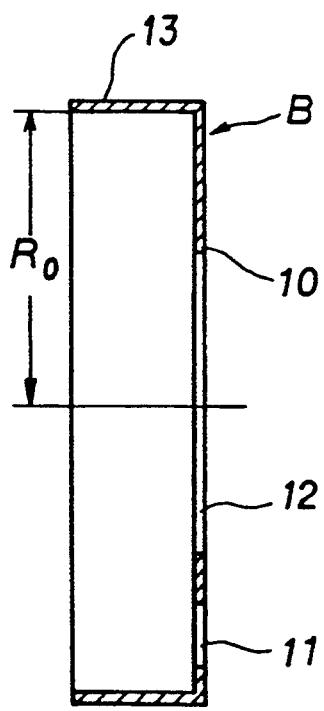
FIG. 6 is a sectional view taken along line Y—Y of FIG. 5.
Figure 7:
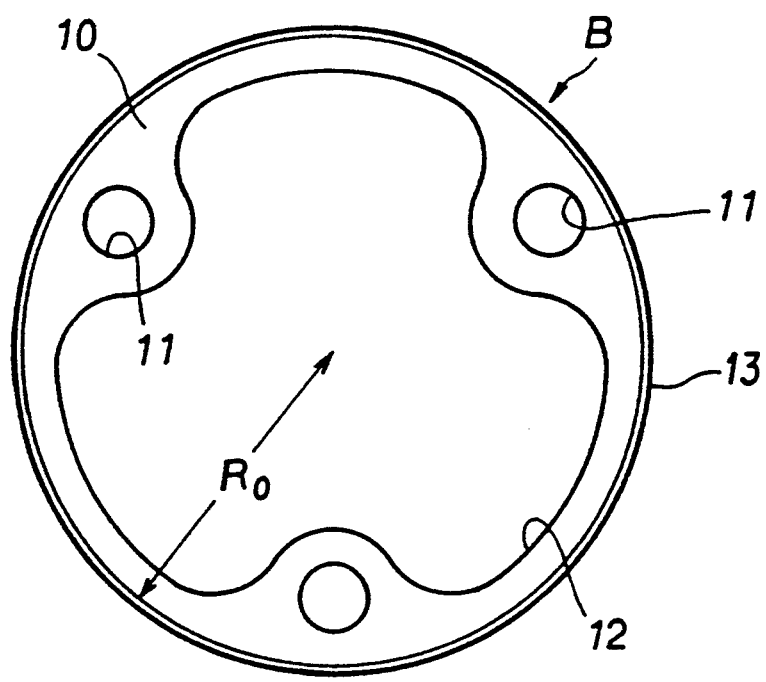
FIG. 7 is a front view of another example of the round housing having the bottom.

As shown in FIG. 4 to FIG. 6, the housing B has an annular flange, annual outer rim or sidewall 13, and a in which holes 11 correspond to the holes 5 of the bushes 3 of the main body A extending inwardly of the annular flange, annular outer rim or sidewall 13. In addition, the inside radius $R_0$ of the housing B is larger than the radius $R_1$ extending to the outer ends of the wings 2 of the main body A but is smaller than the radius $R_2$ extending to the outer surface of bushes 3 ($R_2 > R_0 > R_1$). By pressing the main body A in the housing B, the radius $R_2$ extending to the outer surface of the bushes 3 is reduced to the $R_0$, and the elastic rubbers 4 assume a compressed state to that extent. A reference numeral 12 in these Figures denotes an opening in the center of the bottom 10. The other example of the housing B which is shown in FIG. 7 illustrates a concrete example of a lightweight housing by means of changing the shape of the opening 12. That is, the housing B of FIG. 7 illustrates reduction of the weight of the housing B by widening an area of the opening 12 more than a surface area of the bottom 10.

Inasmuch as the housing B has the bottom 10, the elastic couplings in FIG. 3 and FIG. 4 can be directly fitted to the rotary shaft which is not shown in the Figures.

In regard to the main body A which is utilized in the present invention, instead of the axial hole 6 made in the flange 1 for connection to the spline, it is also possible to use a main body having a structure having holes in its wings 2 to be attached to a yoke formed in the rotary shaft, though it is not illustrated in tile Figures.

As described above, the present invention has the structures mentioned above. In other words, by enclosing the bushes in a round housing having a bottom in the state that the radius extending to the outer surface of the bushes is reduced, a resulting preliminary compression can be given to the elastic rubbers. In addition, since the present invention has, as mentioned above, a bottom joined with the round housing, can be utilized as a coupling without removing the housing. Accordingly, in terms of the assembling process the coupling has a high practical value because it can reduce the number of processes and the like.

What is claimed is;

1. In an elastic coupling comprising:

a main body having a flange with wings extending radially outwardly from the center of the main body and having radially outer ends and an outer radius, bushes arranged between said wings and having outer surfaces located radially outwardly of said ends of said wings, and elastic members connecting said wings and said bushes;

and a pressing means for pressing said bushes toward the center of the main body from the outer circumference of the main body; the improvement wherein said pressing means comprises a permanently affixed round housing with an annular flange, the annular flange having an inner surface, and the housing having a bottom connected to said annular flange, said bottom extending radially inwardly of said annular flange and having a central opening for receiving one of a driven and a driving shaft, said main body having a central hole;

an area between said flange and said elastic members having a passage;

said bushes having a radially outer surface with an outer radius:

said annular flange having an inner radius that is larger than the radii of the radially outer ends of the wings but smaller than the radii of the radially outer surface of the bushes in the unassembled state of said coupling, said annular flange being mounted with its inner surface directly engaging radially outer surfaces of the bushes, whereby said housing forces said bushes radially inwardly to compress said elastic members in the assembled state of said coupling.

2. The elastic coupling according to claim 1 wherein said central opening of said bottom of said housing has an area that is greater than an area of said bottom through which said opening does not extend.

3. An elastic coupling for coupling a driving shaft to a driven shaft for transmitting a turning force therebetween, comprising:

a main body with a center and having a flange with a plurality of radially outwardly extending wings, a plurality of bushes with each bush positioned between a pair of said wings, and a plurality of elastic members, areas between said flange and said elastic members having a passage, said elastic members separately connecting each wing to the bushes adjacent the respective wing, said wings having outer radii, said bushes having radially outer sides and outer radii;

said flange having a central hole for receiving one of said driving and driven shafts, said bushes each having a hole for receiving the other of said shafts;

means for pressing said bushes toward the center of said main body, said pressing means comprising a permanently affixed circular housing having an annular outer rim and a bottom, said bottom extending radially inwardly from said annular outer rim, said outer annular rim having an inner surface directly contacting the radially outer sides of said bushes, said bottom having a central hole aligned with the hole of said flange and additional holes aligned with the holes of said bushes;

the inner radius of said annular outer rim being greater than the outer radii of said wings and smaller than the outer radii of said bushes in the absence of said housing, whereby said housing forces said bushes radially inwardly to compress said elastic members.

4. The elastic coupling of claim 3 wherein the area of said central hole of said bottom is greater than the area of the remainder of said bottom through which said central hole does not extend.

5. The elastic coupling of claim 4 wherein a portion of said central hole in said bottom has an outer radius greater than the radius of said additional holes therein.

* * * * *